United States Patent Office 3,295,855
Patented Jan. 3, 1967

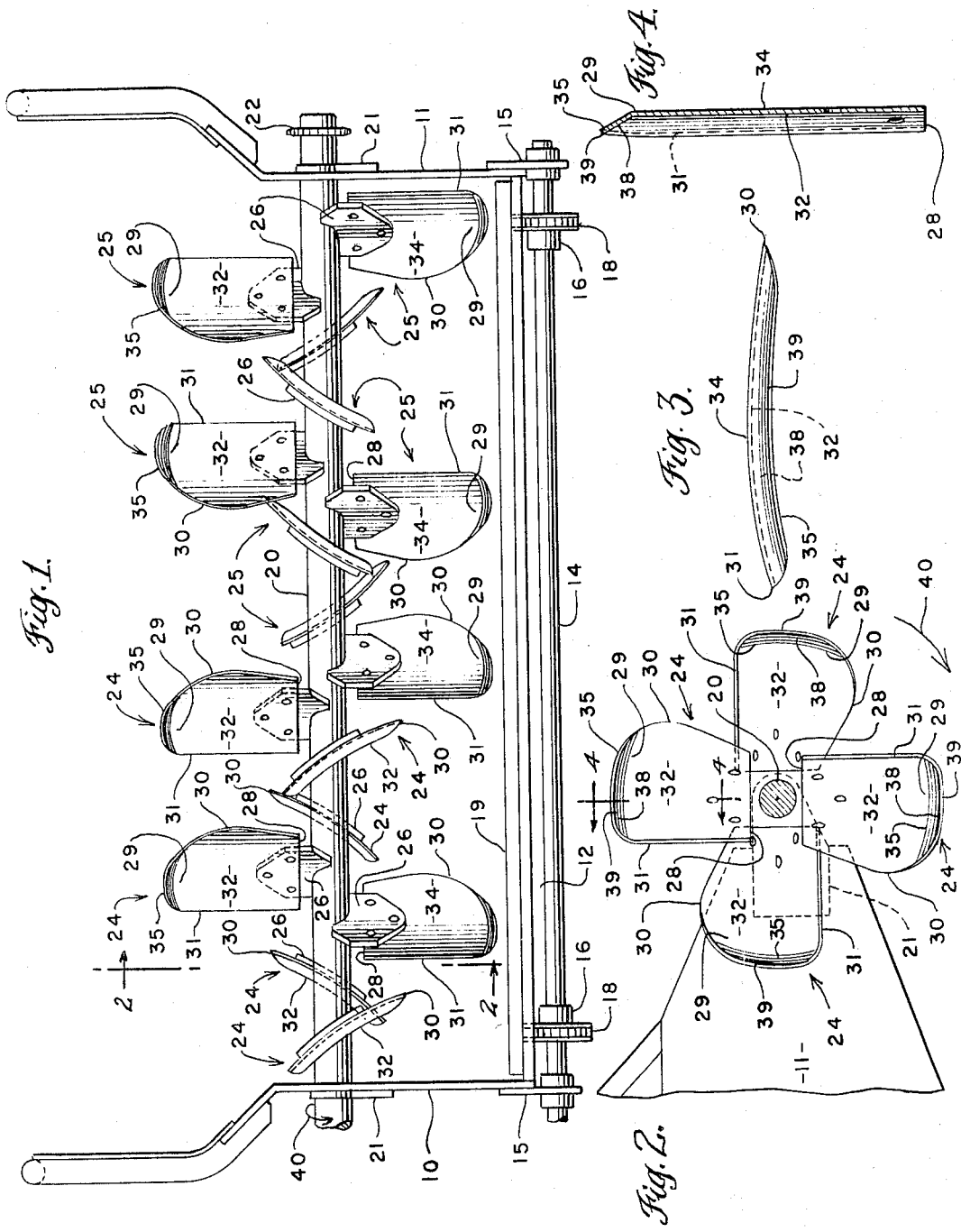

3,295,855
MANURE SPREADER PADDLE
Loren G. Sadler, Stevens, and Charles A. Smith and John K. Hale, New Holland, Pa., assignors to Sperry Rand Corporation, New Holland, Pa., a corporation of Delaware
Filed Jan. 29, 1965, Ser. No. 428,915
8 Claims. (Cl. 275—15)

This invention relates generally to a wide spread attachment for manure spreaders and the like, and more particularly to an improved paddle for a manure spreader wide spread attachment.

One type of conventional manure spreader includes a wagon-like load carrying bed having beaters extending transversely across the open back end thereof. A movable floor apron, or conveyor, moves the entire load progressively rearwardly into engagement with the beaters. The beaters break up the material and discharge it rearwardly from the load carrying bed. It is often desirable to disintegrate the material into particles of as small a size as possible and spread the material over as wide an area as possible. This is the function of a manure spreader wide spread attachment. One example of a manure spreader including a wide spread mechanism may be seen in U.S. Patent 2,699,337.

Wide spread attachments consist of a rotatable shaft extending transversely across the back of a manure spreader wagon behind the beaters and in position to intercept the streams of material being discharged rearwardly by the beaters. The wide spread shaft is rotated at relatively high speed and carries angularly disposed paddles which strike the material and drive it laterally and rearwardly away from the spreader.

It is an object of this invention to provide an improved wide spread paddle which will spread material over a considerably wider area than previous paddle constructions.

It is another object of this invention to provide an improved wide spread paddle which will be more effective than previous paddle constructions in disintegrating manure into fine particles.

It is another object of this invention to provide an improved wide spread paddle which is highly effective in spreading material uniformly.

It is another object of this invention to provide an improved wide spread paddle which achieves the foregoing objects while requiring no noticeable increase in driving power over conventional paddle constructions.

It is another object of this invention to provide a wide spread paddle that achieves the foregoing objects with a structure which is inherently rugged and can be manufactured at low cost.

These and other objects and advantages of this invention will be apparent upon reference to the following description and claims taken in conjunction with the accompaying drawings wherein:

FIG. 1 is an end view of a manure spreader wagon equipped with wide spread paddles constructed in accordance with the principles of the present invention. Associated beaters and other conventional elements have been omitted in the interest of simplification.

FIG. 2 is a sectional view of the wide spread attachment taken on the line 2—2 of FIG. 1.

FIG. 3 is an enlarged plan view of an individual paddle.

FIG. 4 is a sectional view of a paddle taken on the line 4—4 of FIG. 2.

Referring now to the drawings in detail, the numerals 10 and 11 indicate, respectively, the left and right sides of a manure spreader wagon having a bottom, or floor 12. A conventional apron shaft 14 is journalled in brackets 15 and extends transversely across the back of the wagon generally in the plane of spreader bottom 12. Apron shaft 14 carries the usual sprockets 16 about which are entrained apron conveyor chains 18. Apron conveyor slats 19 extend transversely between the chains 18 and are fixedly connected thereto. As is common in the manure spreader art, the apron shaft 14 is driven to slowly move the wagon load of manure rearwardly along floor 12 into engagement with the beater mechanism.

The conventional beater mechanism has been omitted in the drawings to simplify the presentation of the present invention. Reference may be had to the above mentioned patent for a typical showing of this conventional mechanism.

Extending transversely across the open rear end of the wagon is a wide spread shaft 20. Shaft 20 is journalled in brackets 21 carried by the respective sides 10 and 11 of the wagon. The ends of shaft 20 extend outwardly beyond the wagon sides. A sprocket 22 is carried by the shaft 20 at the outwardly extending right end thereof by which the shaft is driven in high speed rotation by conventional means (not shown).

Carried by wide spread shaft 20 is a left set of eight wide spread paddles 24. On the right half of wide spread shaft 20 a right set of eight paddles 25 is mounted. The set of paddles marked 25 are identical to the set marked 24 except that they are formed reversely. The set of paddles marked 24 distribute material outwardly to the left of the wagon while the set 25 distributes material outwardly to the right of the wagon. Each paddle is fixedly atached to a bracket 26 on shaft 20.

Each of the paddles is in a form of a blade having a radially inner end 28 which is attached to the bracket 26 and a radially outer, or free, end 29. Each blade has an arcuate leading edge 30 relative to the direction of rotation of shaft 20. This is the edge that moves upwardly into engagement with the stream of material being discharged rearwardly by the beaters (not shown). Relative to the direction of rotation of shaft 20, the paddles each have a straight trailing edge 31. Since the paddles are all mounted obliquely relative to the wide spread shaft, as is conventional, each paddle has a working, or material engaging, face 32 and a back, or non-working face, 34. According to the present invention, the working face 32 of each paddle is concave about an axis perpendicular to the axis of shaft 20. Since the paddles are made from a single sheet of material of uniform thickness, the back, or non-working face 34 of each paddle is convex. At the radially outer end 29 of each paddle a flange portion 35 extends inwardly at an angle on the working face side of the paddle the depth of the concavity of working face 32. The flange portions 35 each have a concave working face 38 which constitutes a continuation of the main paddle working face 32 (see FIG. 4). The flange portions 35 each have a radially outer edge 39 which interconnects the paddle leading edge 30 and trailing edge 31. The flange edge 39 blends gradually into the blade leading edge 30 on a relatively large radius while it blends into straight trailing edge 31 on a relatively small radius. The direction of rotation of the wide spread shaft is indicated by the arrows 40 in FIGS. 1 and 2. The concave configuration of the blade, along with the inturned flange portion, provides a strong blade section which resists deflection and bending and provides a long service life.

The above described paddle construction has proven in actual practice to distribute material more evenly and over a considerably wider area than previously known paddle constructions for a given speed of operation and at no noticeable increase in driving power requirements while simultaneously providing improved disintegration of material clumps.

It is surmised that these results are attributable to the fact that rather than batting the material, the present paddle blades slice into the stream of material. The material travels along the working face of the blade from leading edge toward the radially outer end of the blade, being centrifugally accelerated in the process. The final powerful outward slinging and clump disintegrating action occurs when the radially moving material comes into contact with the inturned flange portion of the blade.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A paddle mountable on the rotatable wide spread shaft of a manure spreader or the like comprising, a blade having a radially inner end attachable to the shaft and a radially outer end remote from said shaft, said blade having a leading edge relative to the direction of shaft rotation extending between said ends and a trailing edge opposite said leading edge extending between said ends, said blade having a concave material engaging working face on one side thereof extending between said ends and edges, and a flange portion along said radially outer end projecting on said concave working face side of the blade.

2. A paddle as recited in claim 1 wherein said concave material engaging working face is curved about an axis which extends perpendicular to the axis of a shaft upon which said blade is mounted.

3. A paddle as recited in claim 1 wherein said flange portion has a concave working face forming an extension of the working face of said blade.

4. A paddle as recited in claim 1 wherein said flange portion has an outer edge interconnecting said leading and trailing edges.

5. A paddle as recited in claim 4 wherein said leading edge is generally arcuate and blends into said flange outer edge on a relatively large radius.

6. A paddle as recited in claim 5 wherein said trailing edge is straight and blends into said flange outer edge on a relatively small radius.

7. A paddle as recited in claim 1 wherein said blade and said flange portion are integrally formed from a single sheet of material of uniform thickness.

8. A paddle mountable on the rotatable wide spread shaft of a manure spreader or the like comprising, a blade having a radially inner end attachable to the shaft and a radially outer end remote from said shaft, said blade having an arcuate leading edge relative to the direction of shaft rotation extending between said ends and a straight trailing edge opposite said leading edge extending between said ends, said blade having a working face on one side thereof extending between said ends and edges, said working face having an uninterrupted arcuate concave surface between said leading and trailing edges, and a flange portion along said radially outer end extending in the direction of rotation of said shaft between said leading and trailing edges and projecting angularly on the working face side of the blade at least the depth of the concavity of said working-face.

References Cited by the Examiner

UNITED STATES PATENTS

| | | | |
|---|---|---|---|
| 1,177,391 | 3/1916 | Davis | 275—3 |
| 1,820,528 | 8/1931 | Claar | 275—3 |
| 3,175,830 | 3/1965 | Lepp | 275—6 |

ABRAHAM G. STONE, *Primary Examiner.*

J. R. OAKS, *Assistant Examiner.*